(12) United States Patent
Lin

(10) Patent No.: US 9,735,667 B2
(45) Date of Patent: Aug. 15, 2017

(54) POWER SUPPLY MANAGEMENT CIRCUIT UTILIZING MULTISTAGE ACTIVATION AND RELATED MANAGEMENT METHOD

(71) Applicant: FSP TECHNOLOGY INC., Taoyuan (TW)

(72) Inventor: Kuo-Fan Lin, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 0 days.

(21) Appl. No.: 15/159,794

(22) Filed: May 19, 2016

(65) Prior Publication Data

US 2016/0344283 A1 Nov. 24, 2016

Related U.S. Application Data

(60) Provisional application No. 62/163,988, filed on May 20, 2015.

(51) Int. Cl.
| | |
|---|---|
| *G05F 5/00* | (2006.01) |
| *H02M 1/36* | (2007.01) |
| *H02M 1/42* | (2007.01) |
| *H02M 3/335* | (2006.01) |
| *H02M 1/00* | (2006.01) |

(52) U.S. Cl.
CPC .......... *H02M 1/36* (2013.01); *H02M 1/4225* (2013.01); *H02M 3/33507* (2013.01); *H02M 2001/007* (2013.01); *Y02B 70/126* (2013.01)

(58) Field of Classification Search
CPC ........ H02M 1/36; H02M 1/42; H02M 1/4208; H02M 1/4258; H02M 1/4225; H02M 3/33507; H02M 2001/007; H02M 2001/0067; H02M 7/4807; H02M 7/4826; H02M 3/156; Y02B 70/12; Y02B 70/126
USPC .................... 323/207, 266; 363/49
See application file for complete search history.

(56) References Cited

U.S. PATENT DOCUMENTS

| | | | | |
|---|---|---|---|---|
| 2005/0099164 A1* | 5/2005 | Yang | .................... | H02M 1/4225 323/266 |
| 2007/0145956 A1* | 6/2007 | Takeuchi | ............ | H02M 1/4225 323/207 |
| 2008/0304195 A1* | 12/2008 | Lin | ..................... | H02M 1/4225 361/89 |

(Continued)

*Primary Examiner* — Alex Torres-Rivera
(74) *Attorney, Agent, or Firm* — Winston Hsu

(57) ABSTRACT

A management circuit for a power supply is provided. The power supply includes a power factor correction circuit and a power conversion circuit. An output of the power factor correction circuit is coupled to an input of the power conversion circuit. The management circuit includes a power factor correction controller, a pulse width modulation controller and a control circuit. The power factor correction controller controls power factor correction of the power factor correction circuit. The pulse width modulation controller controls power conversion of the power conversion circuit. The control circuit selectively activates the pulse width modulation controller according to a first activated signal generated by an input power of the power supply. After the pulse width modulation controller is activated, the control circuit generates a second activated signal based on the first activated signal. The control circuit activates the power factor conversion controller according to the second activated signal.

14 Claims, 7 Drawing Sheets

(56) References Cited

U.S. PATENT DOCUMENTS

| | | | |
|---|---|---|---|
| 2010/0008117 A1* | 1/2010 | Luthi | H02J 9/005 363/126 |
| 2011/0006748 A1* | 1/2011 | Jang | H02M 1/36 323/299 |
| 2014/0015496 A1* | 1/2014 | Nishiguchi | H02J 7/007 320/162 |
| 2016/0141951 A1* | 5/2016 | Mao | H02M 1/36 363/21.02 |

* cited by examiner

US 9,735,667 B2

POWER SUPPLY MANAGEMENT CIRCUIT UTILIZING MULTISTAGE ACTIVATION AND RELATED MANAGEMENT METHOD

CROSS REFERENCE TO RELATED APPLICATIONS

This application claims the benefit of U.S. provisional application No. 62/163,988, filed on May 20, 2015, the contents of which are incorporated herein by reference.

BACKGROUND OF THE INVENTION

1. Field of the Invention

The disclosed embodiments of the present invention relate to activation control for a power supply, and more particularly, to a management circuit utilizing multistage activation to enable a power supply operation, and a related management method thereof.

2. Description of the Prior Art

A conventional power supply requires high voltage activation to activate a power factor correction (PFC) control chip and a pulse width modulation (PWM) control chip therewithin. The high voltage activation used to activate the PFC control chip and the PWM control chip is applied in the following two ways: (1) use a high voltage activation chip with a high voltage activation/start-up function, and (2) use a high voltage activation/start-up circuit. Regarding each of the aforementioned high voltage activation chip and high voltage activation circuit, sufficient electrical power is required in order to increase a control voltage of the PFC control chip to a maximum voltage and then activate the PWM control chip. However, this results in a relatively high electrical power requirement and a complicated circuit design. The conventional ways not only increase the complexity of control operations, but also increase manufacturing costs.

Thus, there is a need for a novel activation mechanism to simplify circuit designs and control operations, and reduce manufacturing costs.

SUMMARY OF THE INVENTION

It is therefore one objective of the present invention to provide a management circuit utilizing multistage activation to enable a power supply operation, and a related management method to solve the above problems.

It is another objective of the present invention to utilize phase detection to control activation sequence of controllers of a power supply to thereby simplify circuit designs and reduce manufacturing costs.

According to an embodiment of the present invention, an exemplary management circuit for a power supply is disclosed. The power supply comprises a power factor correction circuit and a power conversion circuit. An output of the power factor correction circuit is coupled to an input of the power conversion circuit. The exemplary management circuit comprises a power factor correction controller, a pulse width modulation controller and a control circuit. The power factor correction controller is coupled to the power factor correction circuit, and is arranged for controlling a power factor correction operation of the power factor correction circuit. The pulse width modulation controller is coupled to the power conversion circuit, and is arranged for controlling a power conversion operation of the power conversion circuit. The control circuit is coupled to the power factor correction controller and the pulse width modulation controller, and is arranged for selectively activating the pulse width modulation controller according to a first activated signal generated by an input power of the power supply, wherein after the pulse width modulation controller is activated, the control circuit generates a second activated signal based on the first activated signal, and the control circuit activates the power factor conversion controller according to the second activated signal.

According to an embodiment of the present invention, an exemplary management method for a power supply is disclosed. The power supply comprises a power factor correction circuit and a power conversion circuit. An output of the power factor correction circuit is coupled to an input of the power conversion circuit. The exemplary management method comprises the following steps: selectively activating a pulse width modulation controller according to a first activated signal generated by an input power of the power supply, wherein the pulse width modulation controller controls a power conversion operation of the power conversion circuit; and after the pulse width modulation controller is activated, generating a second activated signal based on at least the first activated signal, and activating a power factor conversion controller according to the second activated signal, wherein the power factor conversion controller controls a power factor conversion operation of the power factor conversion circuit.

The proposed power management mechanism may utilize multistage activation to activate a pulse width modulation controller and a power factor correction controller in sequence, and enable a power factor correction circuit and a power conversion circuit in sequence, thereby realizing a low power activation mechanism. The proposed power management mechanism may not only simplify circuit designs and related control operations, but also reduce manufacturing costs and required activation power.

These and other objectives of the present invention will no doubt become obvious to those of ordinary skill in the art after reading the following detailed description of the preferred embodiment that is illustrated in the various figures and drawings.

DETAILED DESCRIPTION

The proposed power management mechanism may realize multistage activation by controlling operation timing of control circuits of a power supply. The aforementioned operation timing may include: (1) operation timing for activating a controller (or a control chip) to enter an operating state, and (2) operation timing for an activated controller to enable a circuit to perform corresponding operations.

For example, regarding power factor correction (PFC), when an activated voltage (or a start-up voltage) of a PFC controller is greater than a threshold value, the PFC controller may enter an operating state. When an input voltage (or a detected voltage) of the PFC controller which is in the operating state (or an activation state) is greater than a threshold value, the PFC controller may enable the PFC circuit such that the PFC circuit can perform a PFC operation. In other words, before enabling the PFC circuit to perform the PFC operation, the PFC controller needs to be activated in advance to enter the operating state. In view of this, the proposed PFC timing control may include: (1) timing control for activating a PFC controller, and (2) timing control for a PFC controller to enable a PFC circuit.

Based on a multistage activation design, the proposed power management mechanism may activate a pulse width modulation (PWM) controller first and then a PFC controller, thereby enabling a PFC circuit and a power conversion circuit to realize low power activation mechanism. Further description is provided below.

Figure 1:
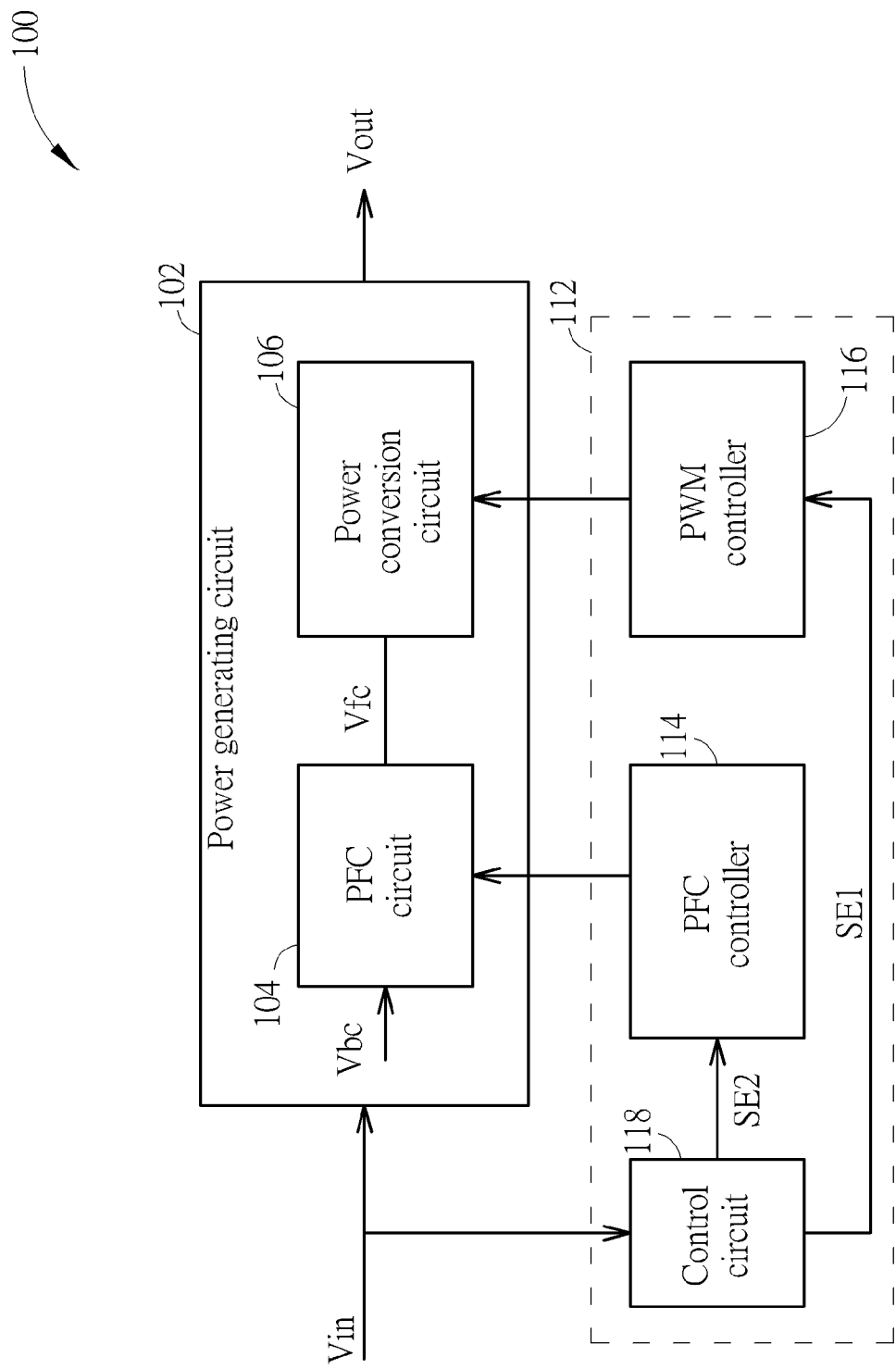
FIG. 1 is a block diagram illustrating an exemplary power supply according to an embodiment of the present invention.
Figure 2:
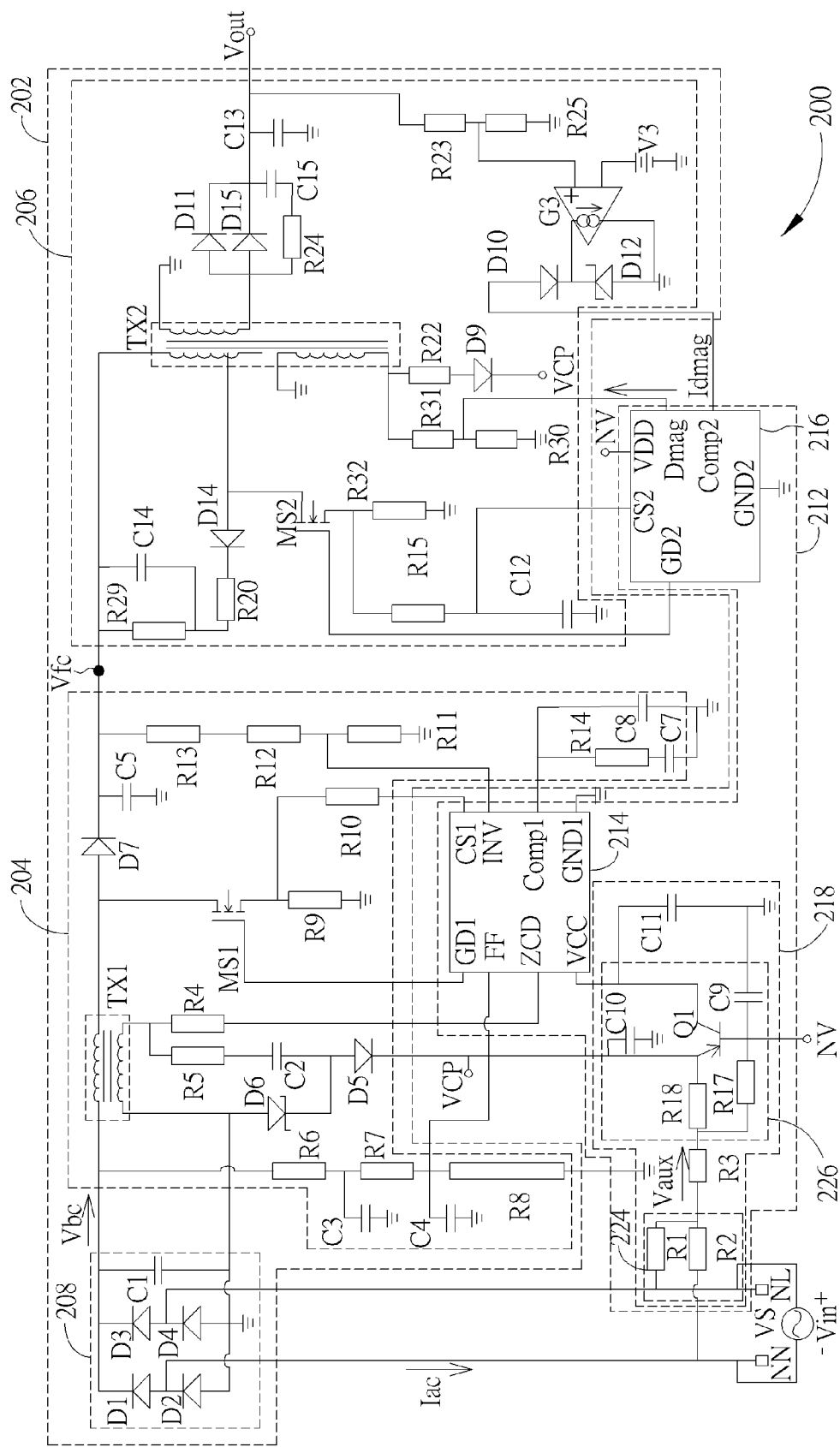
FIG. 2 is an implementation of the power supply shown in FIG. 1.

Please refer to FIG. 1 together with FIG. 2. FIG. 1 is a block diagram illustrating an exemplary power supply according to an embodiment of the present invention. FIG. 2 is an implementation of the power supply 100 shown in FIG. 1. The power supply 100 may provide an output power Vout according to an input power Vin, and include a power generating circuit 102 and a management circuit 112. The management circuit 112 may manage a power supply operation of the power generating circuit 102 according to the input power Vin. In this embodiment, the power generating circuit 102 may include, but is not limited to, a PFC circuit 104 and a power conversion circuit 106. An output of the PFC circuit 104 is coupled to an input of the power conversion circuit 106. In other words, an unconverted power Vfc (equivalent or almost equivalent to a voltage across a capacitor C1 shown in FIG. 2) inputted to the power conversion circuit 106 is a corrected power outputted from the PFC circuit 104.

The management circuit 112 may include a PFC controller 114, a PWM controller 116 and a control circuit 118. The PFC controller 114 is coupled to the PFC circuit 104, and is arranged for controlling a PFC operation of the PFC circuit 104. The PWM controller 116 is coupled to the power conversion circuit 106, and is arranged for controlling a power conversion operation of the power conversion circuit 106. The control circuit 118 is coupled to the PFC controller 114 and the PWM controller 116, and is arranged for selectively activating the PWM controller 116 according to a first activated signal SE1 generated by the input power Vin. After the PWM controller 116 is activated, the control circuit 118 generates a second activated signal SE2 based on the first activated signal SE1. The control circuit 118 then activates the PFC controller 114 according to the second activated signal SE2.

Additionally, in this embodiment, when the PFC controller 114 is activated, the PFC controller 114 may detect an uncalibrated power Vbc inputted to the PFC circuit 104, and accordingly determine whether to enable the PFC circuit 104 to perform the PFC operation. Specifically, the PFC controller 114 may determine whether to enable the PFC circuit 114 to perform the PFC operation based on a detecting result of the uncalibrated power Vbc inputted to the PFC circuit 104. Additionally, when the PWM controller 116 is activated, the PWM controller 116 may detect an activated output VCP generated by the power conversion circuit 106, and accordingly determine whether to enable the power conversion circuit 106 to perform the power conversion operation. Specifically, the PWM controller 116 may determine whether to enable the power conversion circuit 116 to perform the power conversion operation based on a detecting result of the activated output VCP generated by the power conversion circuit 106.

For example, when a signal level of the first activated signal SE1 is greater than a predetermined level, the PWM controller 116 is activated; when the signal level of the first activated signal SE1 is less than the predetermined level, the PWM controller 116 is inactivated. After the PWM controller 116 is activated, the control circuit 118 may activate the PFC controller 114 according to the second activated signal SE2. Next, the PFC controller 114 may detect if the uncalibrated power Vbc is greater than a first threshold value (e.g. 82 volts). When the uncalibrated power Vbc is greater than the first threshold value, the PFC controller 114 may enable the PFC circuit 104 to perform the PFC operation to output the unconverted power Vfc (the corrected power). In addition, when the PWM controller 116 is activated, the PWM controller 116 may detect if the activated output VCP is greater than a second threshold value. When the activated output VCP is greater than the second threshold value, the PWM controller 116 may enable the power conversion circuit 106 to perform the power conversion operation.

Based on the aforementioned multistage activation design, the power supply 100 may realize low power activation mechanism. The power supply 200 shown in FIG. 2 may include a voltage source VS (implemented by an alternating current (AC) power source in this implementation), a power generating circuit 202 and a management circuit 212. The voltage source VS provides the input power Vin through a plurality of nodes NL and NN, and the power generating circuit 102 and management circuit 112 shown in FIG. 1 may be implemented by the power generating circuit 202 and management circuit 212. The power generating circuit 202 may include a PFC circuit 204, a power conversion circuit 206 and a rectifier circuit 208. The rectifier circuit 208 may rectify the input power Vin to generate the uncalibrated power Vbc (i.e. a rectified power). The PFC circuit 204 may perform a PFC operation on the uncalibrated power Vbc to generate the unconverted power Vfc (i.e. a corrected power). The power conversion circuit 206 may perform a power conversion operation on the unconverted power Vfc to generate the output power Vout.

In this implementation, the rectifier circuit 208 may be implemented by, but is not limited to, a bridge rectifier, and include a plurality of diodes D1-D4 and the capacitor C1. The PFC circuit 204 may include, but is not limited to, a transformer TX1, a plurality of resistors R1-R4, a plurality of diodes D5 and D7, a Zener diode D6, a metal-oxide-semiconductor field effect transistor (MOSFET) MS1 and a plurality of capacitors C2-C5, C7 and C8. The power conversion circuit 206 may include, but is not limited to, a transformer TX2, a plurality of resistors R15, R20, R22-R25 and R29-R32, a plurality of diodes D9-D11, D14 and D15, a Zener diode D12, a MOSFET MS2, a plurality of capacitors C12-C15, a direct current (DC) power source V3 and a current transformer G3.

The management circuit 212 may include a PFC controller 214, a PWM controller 216 and a control circuit 218. The PFC controller 114, the PWM controller 116 and the control circuit 118 shown in FIG. 1 may be implemented by the PFC controller 214, the PWM controller 216 and the control circuit 218. In this implementation, the PFC controller 214 may have a plurality of pins GD1, FF, ZCD, VCC, CS1, INV, Comp1 and GND1. Operation of each pin of the PFC controller 214 is briefly described below.

The pin GD1 is coupled to a gate of the MOSFET MS1. The PFC controller 214 may drive the MOSFET MS1 through the pin GD1. The pin FF is coupled to the capacitor C4. The PFC controller 214 may detect the uncalibrated power Vbc through the pin FF. The pin ZCD is coupled to the resistor R4, and is used for zero current detection. The pin VCC is used for receiving the second activated signal SE2 from the control circuit 218. For example, the second activated signal SE2 maybe a voltage signal. When a voltage level of the second activated signal SE2 is greater than a predetermined level (e.g. 12.5 V) (i.e. a voltage level at the pin VCC is greater than the predetermined level), the PFC controller 214 maybe activated and enter an operating state. The pin CS1 is coupled to the resistor R10, and is used for detecting a current flowing through the MOSFET MS1. The pin INV is an input terminal of an error amplifier within the PFC controller 214 (not shown in FIG. 2), and is coupled to the resistor R12 and the resistor R11. The pin Comp1 is coupled to the resistor R14 and the capacitor C8. The PFC controller 214 may perform bandwidth compensation through the pin Comp1. The pin GND1 is coupled to ground.

Additionally, in this embodiment, the PWM controller 216 may have a plurality of pins GD2, VDD, CS2, Dmag, Comp2 and GND2. Operation of each pin of the PWM controller 216 is briefly described below.

The pin GD2 is coupled to a gate of the MOSFET MS2. The PWM controller 216 may drive the MOSFET MS2 through the pin GD2. The pin VDD is used for receiving the first activated signal SE1 through a node NV of the control circuit 218. For example, the first activated signal SE1 maybe a voltage signal. When a voltage level of the first activated signal SE1 is greater than a predetermined level (e.g. 14.5 V) (i.e. a voltage level at the pin VDD is greater than the predetermined level), the PWM controller 216 may be activated and enter an operating state. The pin CS2 is coupled to the resistor R15, and is used for detecting a current flowing through the MOSFET MS2. The pin Comp2 is coupled to the diode D10. The PWM controller 216 may perform loop compensation through the pin Comp2. The pin GND2 is coupled to ground. The pin Dmag is coupled to the resistor R30 and R31. The PWM controller 216 determines whether to enable the power conversion circuit 206 to perform the power conversion operation according to a detecting result of the activated output VCP generated by the power conversion circuit 206 or a voltage across the capacitor C10 through the pin Dmag.

The controller 218 may include a start-up circuit 224 and a phase detection circuit 226. The start-up circuit 224 may receive the input power Vin provided by the voltage source VS to thereby generate an auxiliary power Vaux. In this implementation, the start-up circuit 224 may include a plurality of resistors R1 and R2. In a case where the voltage source VS is implemented by an AC power source, the resistors R1 and R2 may provide the input power Vin (i.e. an AC voltage) to the phase detection circuit 226 during a first half cycle and a second half cycle respectively, and accordingly generate the first activated signal SE1.

The phase detection circuit 226 is coupled to the start-up circuit 224, and may generate the first activated signal SE1 according to the auxiliary power Vaux and detect a phase of the first activated signal SE1. It should be noted that, by detecting the phase of the first activated signal SE1, the control circuit 218 may ensure successful activation of the PFC controller 214 after the activation of the PWM controller 216. For example, when a signal level of the first activated signal SE1 is greater than a predetermined level and the phase of the first activated signal SE1 is greater than a predetermined value, the phase detection circuit 226 may generate the second activated signal SE2 according to the first activated signal SE1. In practice, the phase detection circuit 226 may include an energy storage element (implemented by the capacitor C10 in this embodiment), which may be used for storing energy of the auxiliary power Vaux to generate a storage result (i.e. the voltage across the capacitor C10). When the signal level of the first activated signal SE1 is greater than the predetermined level and the phase of the first activated signal SE1 is greater than the predetermined value, the phase detection circuit 226 may output the storage result to generate the second activated signal SE2.

The phase detection circuit 226 may further include a capacitor C9, a switch element (implemented by a bipolar junction transistor (BJT) Q1 in this embodiment) and a plurality of resistors R17 and R18. The resistor R18 is coupled between the resistor R3 and an emitter of the BJT Q1, the resistor R17 is coupled between the resistor R3 and a base of the BJT Q1 (or the node NV), and a collector of the BJT Q1 is coupled to the pin VCC and the capacitor C11. In the embodiment shown in FIG. 2, as the emitter of the BJT Q1 is further coupled to the capacitor C10 and the activated output VCP, the BJT Q1 is selectively turned on according to a voltage of the activated output VCP (or the voltage across the capacitor C10) and the first activated signal SE1 (or a voltage at the node NV).

Figure 3:
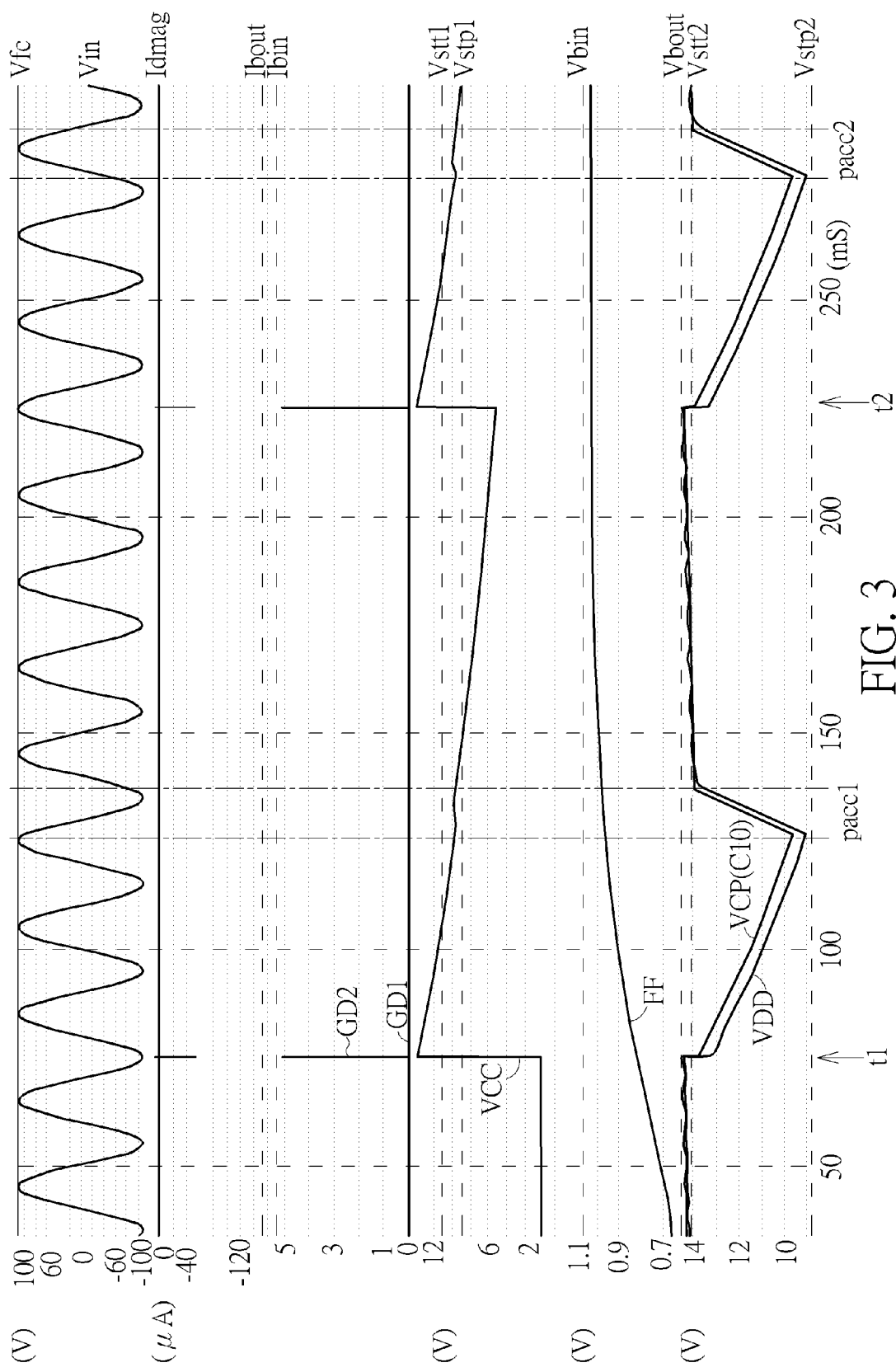
FIG. 3 illustrates a timing diagram of the power supply shown in FIG. 2 operating in an inactivated mode according to an embodiment of the present invention.

To further describe the proposed power management mechanism, FIGS. 3-6 illustrate timing diagrams of the power supply shown in FIG. 2 operating in an inactivated mode and an activated mode. Firstly, please refer to FIG. 3 in conjunction with FIG. 2. FIG. 3 illustrates a timing diagram of the power supply 200 shown in FIG. 2 operating in the inactivated mode according to an embodiment of the present invention. In the embodiment shown in FIG. 3, as the power supply 200 is inactivated (i.e. each of the PFC circuit 204 and the power conversion circuit 206 is not enabled), a voltage level of the unconverted power Vfc equals to a peak level of the input power Vin. Additionally, before the PWM controller 216 is activated, the voltage source VS may provide a current (e.g. 0.5 µA) for the PWM controller 216 through the resistors R3 and R17, and charge the capacitor C10 through the resistors R3 and R18.

At a point in time t1 shown in FIG. 3, as the PWM controller 216 detects that a voltage level at the pin VDD is greater than a predetermined level Vstt2 (e.g. 14.5 V), the PWM controller 216 may be activated and extract a higher current (e.g. greater than 1 mA) from the resistor R17 to thereby turning on the BJT Q1. When the BJT is turned on, energy stored in the capacitor C10 may be transmitted to the pin VCC through the BJT Q1. As the voltage source VS continues charging the capacitor C10, the voltage across the capacitor C10 may be greater than a predetermined level Vstt1 (e.g. 12.5 V), thus activating the PFC controller 214.

In addition, when the PWM controller 216 is activated, the pin GD2 outputs a high voltage level, and the PWM controller 216 determines whether to enable the power conversion circuit 206 to perform the power conversion operation according to the voltage level of the activated output VCP (or the capacitor C10) detected by the pin Dmag. As the voltage level of the activated output VCP is not greater than a predetermined level when the PWM controller 216 is activated, the PWM controller 216 does not enable the power conversion circuit 206 to perform the power conversion operation.

After the PFC controller 214 is activated, the PFC controller 214 determines whether to enable the PFC circuit 204 to perform the PFC operation according to the uncalibrated power Vbc detected by the pin FF. In the embodiment shown in FIG. 3, as a voltage level at the pin FF is lower than a brown-in level Vbin (e.g. 1.1 V), the PFC controller 214 does not enable the PFC circuit 204, and a voltage level at the pin GD1 is low.

In the embodiment shown in FIG. 3, as the power supply 200 does not enter the activated mode (i.e. each of the PFC circuit 204 and the power conversion circuit 206 is not enabled) at the point in time t1, each of the PFC controller 214 and the PWM controller 216 is turned off until a point in time t2 at which the voltage level at the pin VDD is greater than the predetermined level Vstt2 again. It should be noted that, in order to depict respective signal responses around the points in time t1 and t2, lengths corresponding to time intervals Pacc1 and Pacc2 shown in FIG. 3 have been shortened. In other words, an actual length of the time interval Pacc1/Pacc2 is longer than the length shown in FIG. 3.

Further, in a case where a hysteresis effect is taken into account, FIG. 3 further depicts a brown-out level Ibout used for determining whether to disable the power conversion circuit 206, a brown-out level Vbout used for determining whether to disable the PFC circuit 204, a predetermined level Vstp1 used for determining whether to stop activating the PFC controller 214, and a predetermined level Vstp2 used for determining whether to stop activating the PWM controller 216. As a person skilled in the art should understand the meanings and usage scenarios of the brown-out level Ibout, brown-out level Vbout, the predetermined level Vstp1 and the predetermined level Vstp2, further description is omitted here for brevity.

Figure 4:
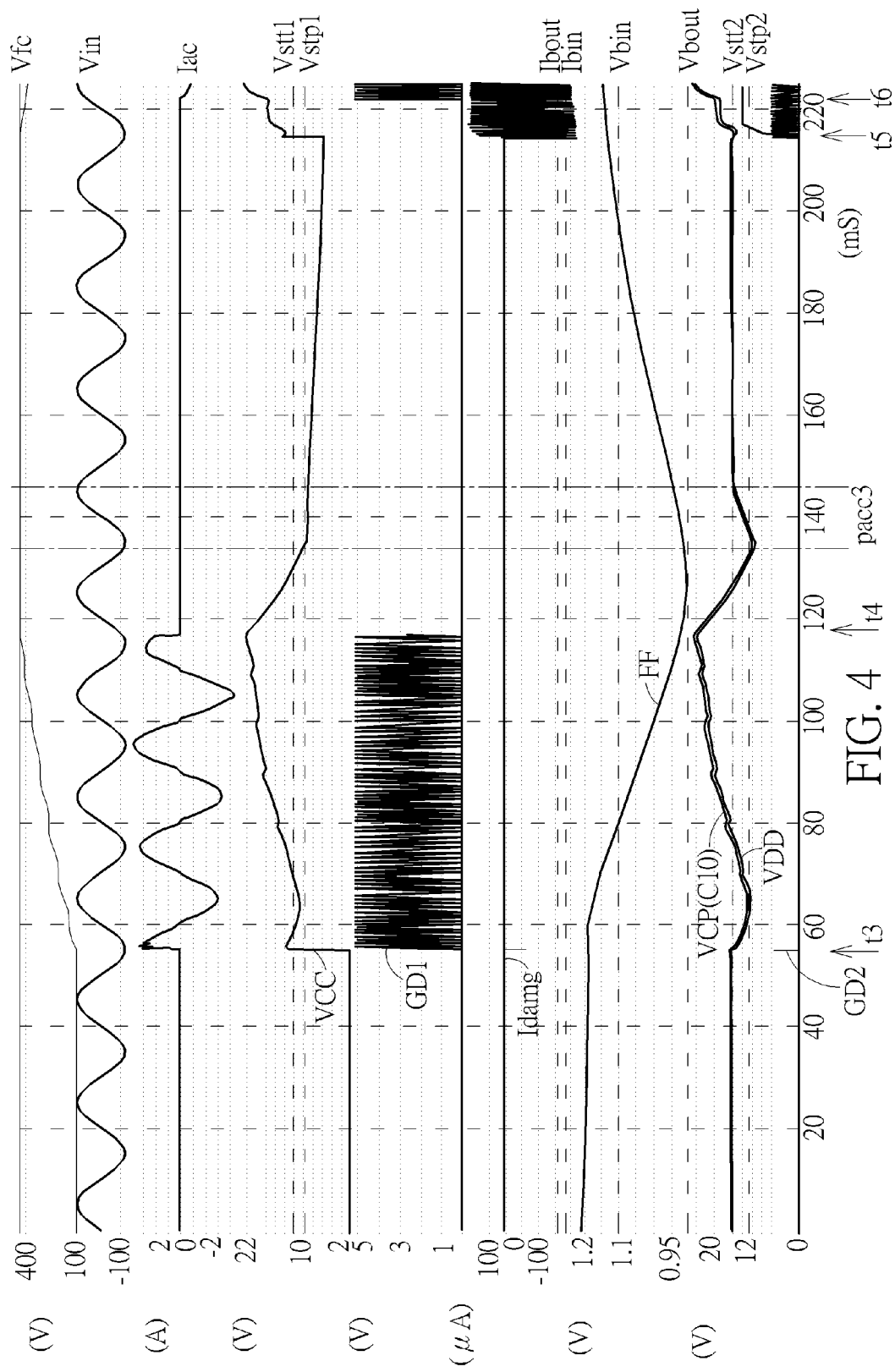
FIG. 4 is a timing diagram of the power supply shown in FIG. 2 switching from an inactivated mode to an activation mode according to an embodiment of the present invention.
Figure 5:
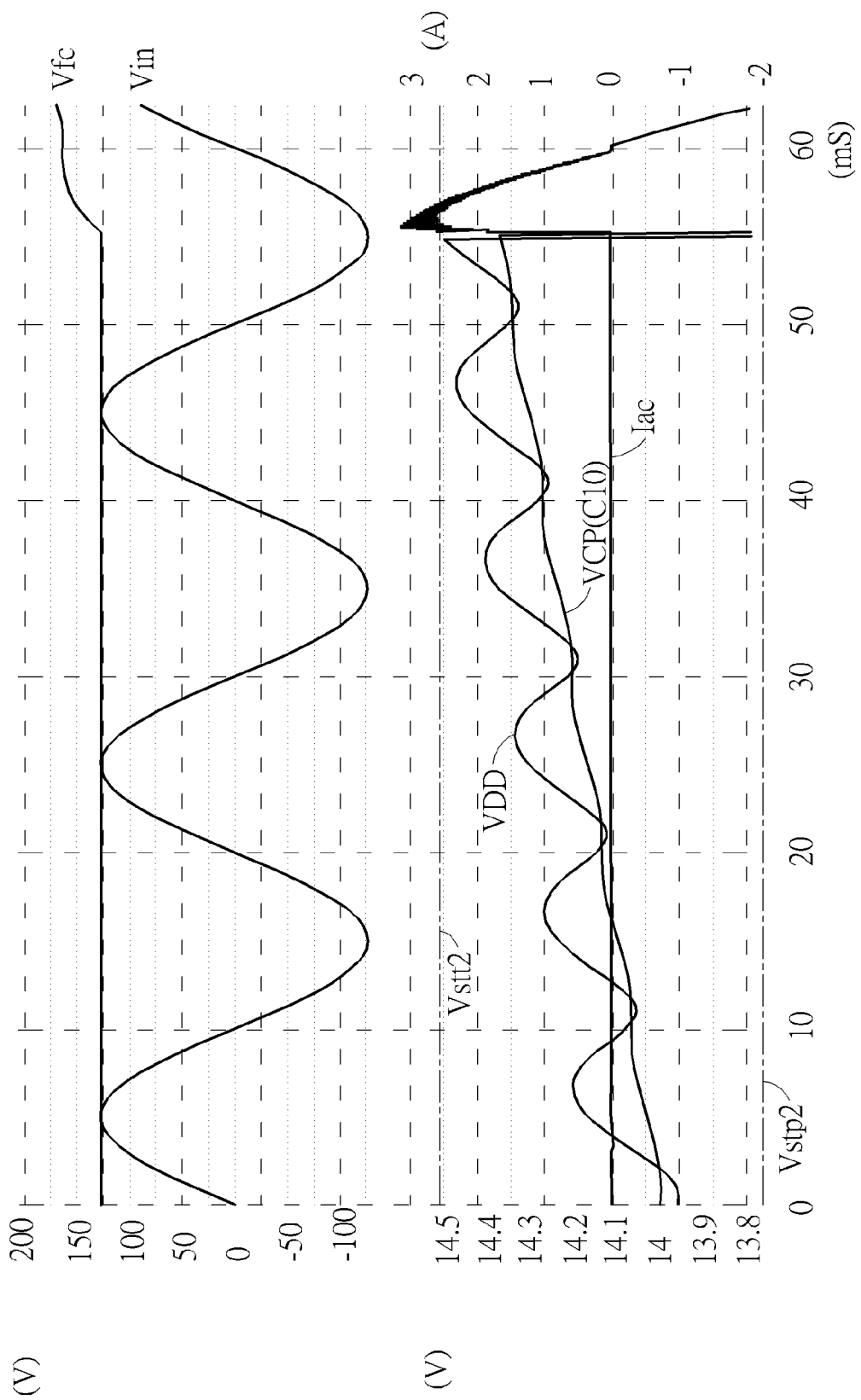
FIG. 5 is a timing diagram of the power supply shown in FIG. 2 activating a power width modulation controller according to an embodiment of the present invention.

Please refer to FIG. 4 in conjunction with FIG. 2. FIG. 4 is a timing diagram of the power supply 200 shown in FIG. 2 switching from the inactivated mode to the activation mode according to an embodiment of the present invention. At a point in time t3, the voltage level at the pin VDD is greater than the predetermined level Vstt2, thus activating the PWM controller 216. Additionally, as an amount of the current Idmag is less than an amount of the brown-in level Ibin when the PWM controller 216 is activated, the PWM controller 216 does not enable the power conversion circuit 206 to perform the power conversion operation at the point in time t3.

When the PWM controller 216 is activated, the PWM controller 216 may extract a higher current from the resistor R17 to turn on the BJT Q1, thereby activating the PFC controller 214. In the embodiment shown in FIG. 4, the voltage level at the pin FF is greater than the brown-in level Vbin (e.g. 1.1 V). Hence, the PFC controller 214 may enable the PFC circuit 204 to perform the PFC operation, the voltage level at the pin GD1 switches between a high level and a low level alternately, and an input current Iac has a sinusoidal waveform. After the PFC circuit 204 perform the PFC operation, the voltage level of the unconverted power Vfc keeps increasing due to the operation of the PFC circuit 204. In addition, the PFC circuit utilizes the transformer TX1 to generate an induced voltage, and provides the induced voltage to the capacitor C10 through the resistor R5, the capacitor C2 and the diode D5, thereby maintaining the operations of the PFC controller 214 and the PWM controller 216.

At a point in time t4, as the power supply 200 shown in FIG. 2 operates under a no load condition, the voltage level of the unconverted power Vfc increases to be greater than a regulation level of the PFC circuit 204 (e.g. 400 V), which causes the PFC controller 214 to turn off the PFC circuit 204. After the PFC circuit 204 is turned off, the capacitor C10 is unable to continue providing energy required by the PFC controller 214 and the PWM controller 216, and the PFC controller 214 and the PWM controller 216 are turned off accordingly.

After a period of time (including a time interval Pacc3, a length of which has been shortened), the PWM controller 216 and the PFC controller 214 may be activated again in sequence at a point in time t5 (the voltage level at the pin VDD is greater than the predetermined level Vstt2 and the voltage level at the pin VCC is greater than the predetermined level Vstt1). After the PWM controller 216 is activated, the PWM controller 216 may detect the voltage level of the activated output VCP (or the capacitor C10) through the pin Dmag. When the voltage level of the activated output VCP is greater than the predetermined level, the PWM controller 216 may enable the power conversion circuit 206 to perform the power conversion operation (the voltage level of the output power Vout starts to increase). Further, after the PFC controller 214 is activated, the PFC controller 214 may detect the voltage level at the pin FF. When the voltage level at the pin FF is greater than the brown-in level Vbin (e.g. 1.1 V), the PFC controller 214 may enable the PFC circuit 204 to perform the PFC operation.

In view of the above, at the point in time t3, the PWM controller 216 and the PFC controller 214 maybe activated in sequence, and then the PFC controller 214 enables the PFC circuit 204. At the point in time t5, the PWM controller 216 and the PFC controller 214 may be activated again in sequence. Next, the PWM controller 216 enables the power conversion circuit 206. Hence, the point in time t3 may be regarded as a first activation time point of the power supply 200 (the PFC circuit 204 starts to operate), and the point in time t5 maybe regarded as a second activation time point of the power supply 200 (the power conversion circuit 206 starts to operate).

When the PWM controller 216 enables the power conversion circuit 206 to perform the power conversion operation (e.g. at the point in time t5), the PFC controller 214 may enable the PFC circuit 204 according to the second activated signal SE2 under a condition where the unconverted power Vfc is less than the regulation level. In one implementation, when a power level of the unconverted power Vfc is greater than the regulation level (the unconverted power Vfc is too high), the PFC circuit 204 may disable the PFC operation of the PFC circuit 204. In another implementation, when the power level of the unconverted power Vfc is less than the regulation level, the PFC circuit 204 may enable the PFC circuit 204 according to the second activated signal SE2. For example, in this embodiment, as the voltage level of the unconverted power Vfc is greater than the regulation level (400 V) at the point in time t5, the PFC controller 214 does not enable the PFC circuit 204 until a point in time t6 at which the voltage level of the unconverted power Vfc is less than the regulation level. Additionally, between the points in time t5 and t6, as the power conversion circuit 206 is in an operating state, part of the energy stored in the capacitor C10 may be provided by the activated output VCP (i.e. the voltage level at the pin VCC may continue increasing).

In the embodiment shown in FIG. 4, after the PFC controller 214 is activated, the voltage level at the pin VCC decreases (the point in time t3). In order to prevent the voltage level at the pin VCC from being decreased to be less than the predetermined level Vstp1 to turn off the PFC controller 214, the phase detection circuit 226 may activate the PWM controller 216 according to the first activated signal SE1 when the signal level of the first activated signal SE1 is greater than the predetermined level Vstt2 and the phase of the first activated signal SE1 is greater than a predetermined value (e.g. a phase around 90 degrees), thereby activating the PFC controller 214 according to the second activated signal SE2. Please refer to FIG. 5, which is a timing diagram of the power supply 200 shown in FIG. 2 activating the PWM controller 216 according to an embodiment of the present invention. In the embodiment shown in FIG. 5, as the voltage level at the pin VDD includes an AC component provided by the input power Vin, the phase of the first activated signal SE1 is greater than a predetermined value (e.g. a phase around 90 degrees; a phase corresponding to a peak level of the AC component) when the voltage level at the pin VDD reaches the predetermined level Vstt2 (e.g. 14.5 V). Since the second activated signal SE2 is generated in a case where the signal level of the first activated signal SE1 is greater than the predetermined level Vstt2 and the phase of the first activated signal SE1 is greater than the predetermined value (i.e. the BJT Q1 is turned on), the second activated signal SE2 may have sufficient energy to enhance the voltage level at the pin VDD, thus ensuring that the voltage level at the pin VCC is not less than the predetermined level Vstp1 after the PFC controller 214 is activated.

In brief, the phase detection circuit 226 may utilize the capacitor C10 to store activation energy required by control chip(s), and activate the control chip(s) when the phase of the first activated signal SE1 is greater than a predetermined value, thus realizing low-current activation mechanism.

Figure 6:
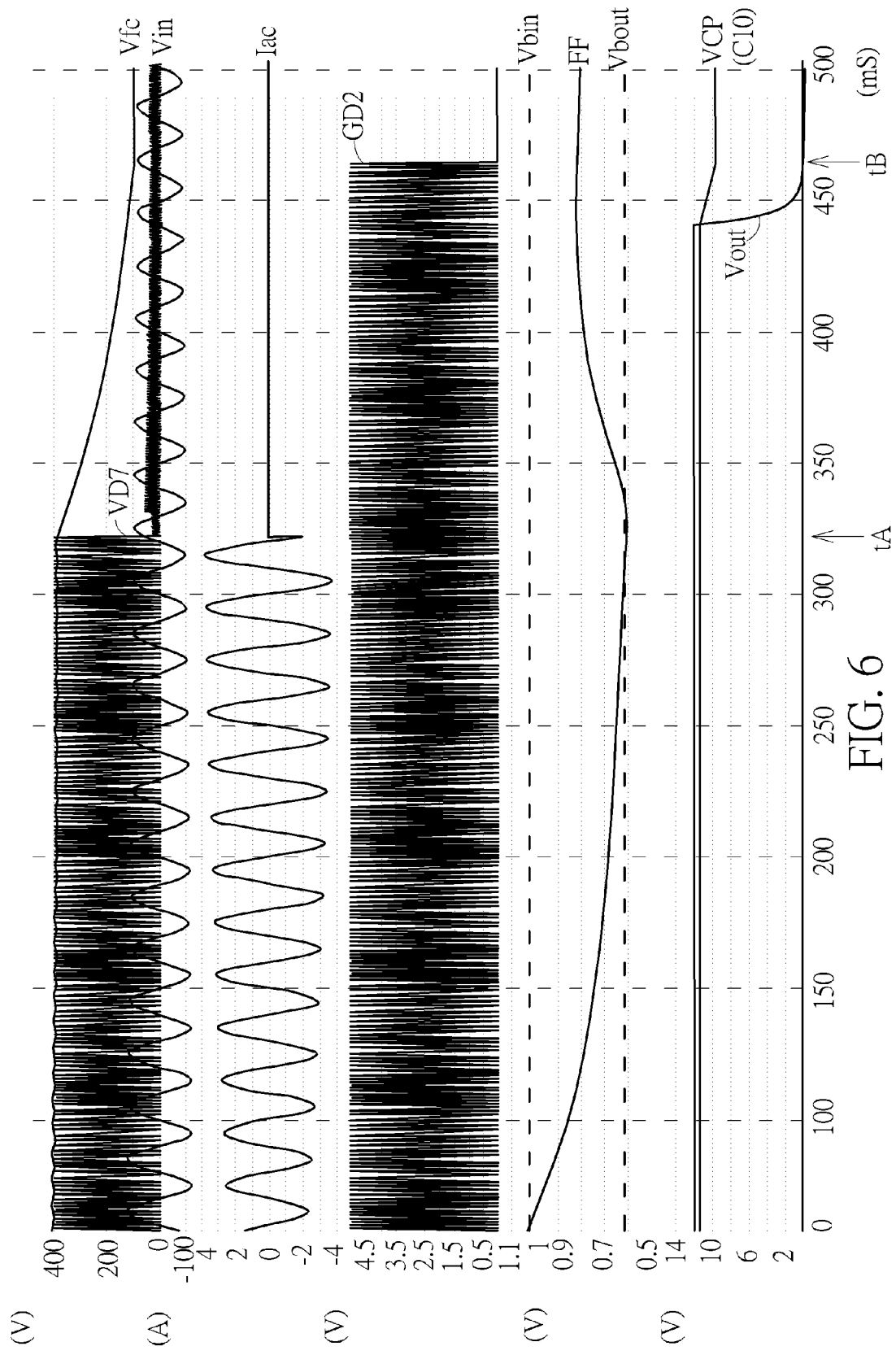
FIG. 6 is a timing diagram of the power supply shown in FIG. 2 switching from an activated mode to an inactivation mode according to an embodiment of the present invention.

Please refer to FIG. 6 in conjunction with FIG. 2. FIG. 6 is a timing diagram of the power supply 200 shown in FIG. 2 switching from the activated mode to the inactivation mode according to an embodiment of the present invention. At a point in time tA, as the voltage level at the pin FF is less than the brown-out level Vbout, the PFC controller 214 may turnoff the PFC circuit 204. Accordingly, a voltage VD7 at an anode of the diode D7 decreases, and causing the voltage level of the unconverted power Vfc decreases as well. At a point in time tB, as the pin Dmag detects that the voltage level of the activated output VCP (or the capacitor C10) is less than the predetermined level, the PWM controller 216 may turn off the power conversion circuit 206.

Based on the aforementioned multistage activation design, only low electrical power is required for the power supply 200 to complete the activation process. However, the above is for illustrative purposes only, and is not meant to be a limitation of the present invention. In an alternative design, the PFC controller 214 may be implemented by other types of PFC control chips, and/or the PWM controller 216 maybe implemented by other types of PWM control chips. In another alternative design, it is possible to employ different circuit topologies to implement the PFC circuit 204 and/or the power conversion circuit 206. In yet another alternative design, it is possible to employ different circuit topologies to implement the control circuit 218. For example, the resistor R3 may be optional. In another example, the start-up circuit 224 and/or the phase detection circuit 226 may be implemented using different circuit topologies.

Figure 7:
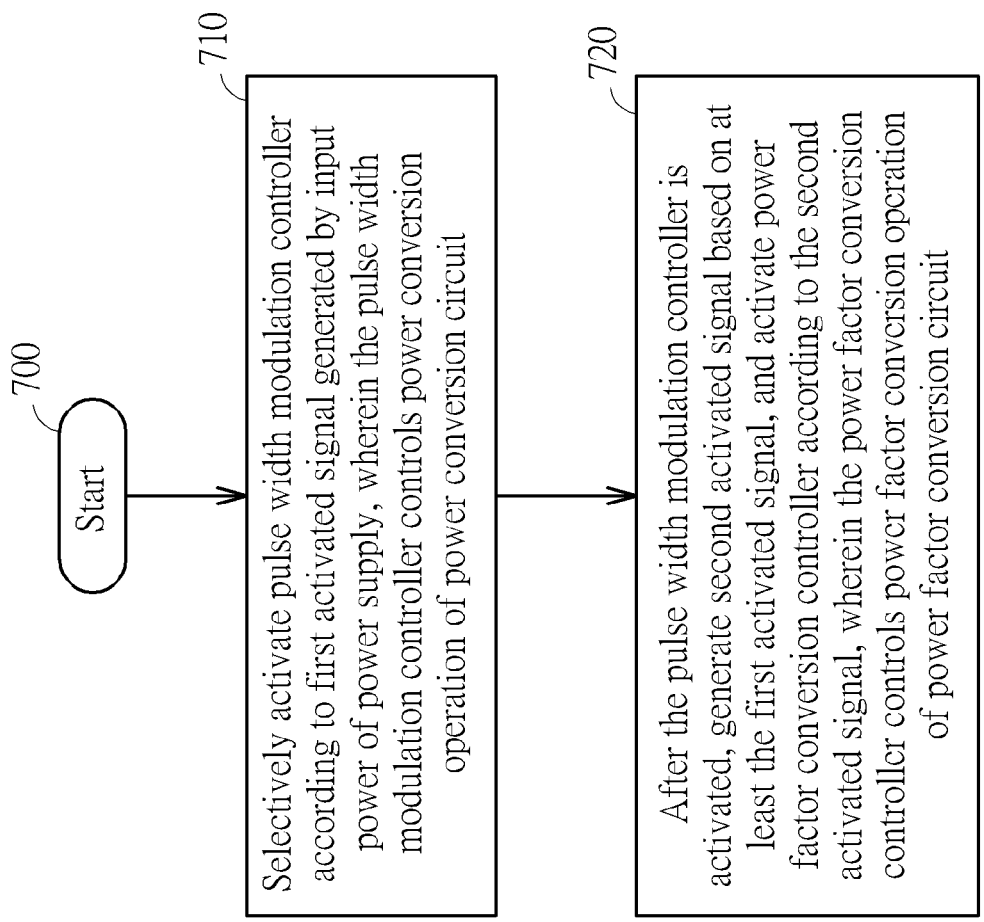
FIG. 7 is a flow chart of an exemplary management method for a power supply according to an embodiment of the present invention.

The proposed management method for a power supply may be summarized in FIG. 7. FIG. 7 is a flowchart of an exemplary management method for a power supply according to an embodiment of the present invention. The power supply includes a power factor correction circuit and a power conversion circuit. An output of the power factor correction circuit is coupled to an input of the power conversion circuit. For illustrative purposes, the management method shown in FIG. 7 is described with reference to the power supply 100 shown in FIG. 1. However, a person skilled in the art should understand that this is not meant to be a limitation of the present invention. The management method shown in FIG. 7 may be summarized below.

Step 700: Start.

Step 710: Selectively activate a PWM controller according to a first activated signal generated by an input power of the power supply. The PWM controller controls a power conversion operation of the power conversion circuit. For example, the first activated signal SE1 is generated according to the input power Vin of the power supply 100 to selectively activate the PWM controller 116. The PWM controller 116 may be used for controlling the power conversion operation of the power conversion circuit 106.

Step 720: After the PWM controller is activated, generate a second activated signal based on at least the first activated signal, and activate a PFC controller according to the second activated signal. The PFC controller controls a PFC operation of the PFC circuit. For example, after the PWM controller 116 is activated, the second activated signal SE2 is generated according to at least the first activated signal SE1 to activate the PFC controller 114. The PFC controller 114 is used for controlling the PFC operation of the PFC circuit 104.

In step 710, when a signal level of the first activated signal is greater than a predetermined level (e.g. 14.5 V, or the predetermined level Vstt2 shown in FIG. 3), the PWM controller is activated, and when the signal level of the first activated signal is less than the predetermined level, the PWM controller is inactivated. In one implementation, after being activated, the PWM controller may determine whether to enable the power conversion circuit to perform the power conversion operation based on a detecting result of an activated output generated by the power conversion circuit (e.g. the activated output VCP shown in FIG. 2).

In step 720, by detecting a phase of the first activated signal to generate the second activated signal so as to activate the PFC controller. For example, when a signal level of the first activated signal is greater than a predetermined level and the phase of the first activated signal is greater than a predetermined value, the second activated signal being generated according to the first activated signal.

In this embodiment, when the PFC controller is activated, the flow may determine whether to enable the PFC circuit to perform the PFC operation based on a detecting result of an uncalibrated power inputted to the power factor correction circuit (e.g. the uncalibrated power Vbc shown in FIG. 1). In one implementation, after the PFC circuit performs the PFC operation, the flow may detect an unconverted power inputted from the PFC circuit to the power conversion circuit (e.g. the unconverted power Vfc), and control the PFC circuit according to the unconverted power. By way of example but not limitation, the step of controlling the PFC circuit according to the unconverted power comprises: when a power level of the unconverted power is greater than a predetermined level (e.g. a regulation level such as 400 V), disable the PFC operation of the PFC circuit, and when the power level of the unconverted power is less than the predetermined level, enable the PFC circuit according to the second activated signal.

Please note that if the result is substantially the same, the steps are not required to be executed in the exact order shown in FIG. 7. For example, other steps may be added. After reading through the aforementioned description of FIGS. 1-6, a person skilled in the art should understand the operation of each step of the exemplary management method shown in FIG. 7. Therefore, further description is omitted here for brevity.

To sum up, the proposed power management mechanism may utilize multistage activation to activate a PWM controller and a PFC controller in sequence, and enable a PFC circuit and a power conversion circuit in sequence to realize a low power activation mechanism. The proposed power management mechanism may not only simplify circuit designs and related control operations, but also reduce manufacturing costs and required activation power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A management circuit for a power supply, the power supply comprising
a power factor correction circuit and a power conversion circuit, an output of the power factor correction circuit being coupled to an input of the power conversion circuit, the management circuit comprising:
a power factor correction controller, coupled to the power factor correction circuit, the power factor correction controller arranged for controlling a power factor correction operation of the power factor correction circuit;
a pulse width modulation controller, coupled to the power conversion circuit, the pulse width modulation controller arranged for controlling a power conversion operation of the power conversion circuit; and
a control circuit, coupled to the power factor correction controller and the pulse width modulation controller, the control circuit arranged for selectively activating the pulse width modulation controller according to a first activated signal generated by an input power of the power supply, wherein after the pulse width modulation controller is activated, the control circuit generates a second activated signal based on the first activated signal, and the control circuit activates the power factor conversion controller according to the second activated signal.

2. The management circuit of claim 1, wherein when a signal level of the first activated signal is greater than a predetermined level, the pulse width modulation controller is activated, and when the signal level of the first activated signal is less than the predetermined level, the pulse width modulation controller is inactivated.

3. The management circuit of claim 1, wherein after the pulse width modulation controller is activated, the pulse width modulation controller determines whether to enable the power conversion circuit to perform the power conversion operation based on a detecting result of an activated output generated by the power conversion circuit.

4. The management circuit of claim 1, wherein when the power factor correction controller is activated, the power factor correction controller determines whether to enable the power factor correction circuit to perform the power factor correction operation based on a detecting result of an uncalibrated power inputted to the power factor correction circuit.

5. The management circuit of claim 4, wherein after the power factor correction controller enables the power factor correction circuit to perform the power factor correction operation, the power factor correction controller detects an unconverted power inputted from the power factor correction circuit to the power conversion circuit, and controls the power factor correction circuit according to the unconverted power.

6. The management circuit of claim 5, wherein when the power factor correction controller detects that a power level of the unconverted power is greater than a predetermined level, the power factor correction controller disables the power factor correction operation of the power factor correction circuit; and when the power factor correction controller detects that the power level of the unconverted power is less than the predetermined level, the power factor correction controller enables the power factor correction circuit according to the second activated signal.

7. The management circuit of claim 1, wherein the control circuit comprises:
an activation circuit, for receiving the input power to generate an auxiliary power; and
a phase detection circuit, coupled to the activation circuit, the phase detection circuit arranged for generating the first activated signal according to the auxiliary power, and detecting a phase of the first activated signal, wherein when a signal level of the first activated signal is greater than a predetermined level and the phase of the first activated signal is greater than a predetermined value, the phase detection circuit generates the second activated signal according to the first activated signal.

8. A management method for a power supply, the power supply comprising
a power factor correction circuit and a power conversion circuit, an output of the power factor correction circuit being coupled to an input of the power conversion circuit, the management method comprising:
selectively activating a pulse width modulation controller according to a first activated signal generated by an input power of the power supply, wherein the pulse width modulation controller controls a power conversion operation of the power conversion circuit; and
after the pulse width modulation controller is activated, generating a second activated signal based on at least the first activated signal, and activating a power factor conversion controller according to the second activated signal, wherein the power factor conversion controller controls a power factor conversion operation of the power factor conversion circuit.

9. The management method of claim 8, wherein when a signal level of the first activated signal is greater than a predetermined level, the pulse width modulation controller is activated, and when the signal level of the first activated signal is less than the predetermined level, the pulse width modulation controller is inactivated.

10. The management method of claim 8, wherein after the pulse width modulation controller is activated, the management method further comprises:
determining whether to enable the power conversion circuit to perform the power conversion operation based on a detecting result of an activated output generated by the power conversion circuit.

11. The management method of claim 8, wherein when the power factor correction controller is activated, the management method further comprises:

determining whether to enable the power factor correction circuit to perform the power factor correction operation based on a detecting result of an uncalibrated power inputted to the power factor correction circuit.

12. The management method of claim 11, wherein after the power factor correction controller enables the power factor correction circuit to perform the power factor correction operation, the management method further comprises:

detecting an unconverted power inputted from the power factor correction circuit to the power conversion circuit, and controlling the power factor correction circuit according to the unconverted power.

13. The management method of claim 12, wherein the step of controlling the power factor correction circuit according to the unconverted power comprises:

when a power level of the unconverted power is greater than a predetermined level, disabling the power factor correction operation of the power factor correction circuit; and when the power level of the unconverted power is less than the predetermined level, enabling the power factor correction circuit according to the second activated signal.

14. The management method of claim 8, wherein the step of generating the second activated signal based on at least the first activated signal comprises:

detecting a phase of the first activated signal; and when a signal level of the first activated signal is greater than a predetermined level and the phase of the first activated signal is greater than a predetermined value, generating the second activated signal according to the first activated signal.

\* \* \* \* \*